Figure 1:
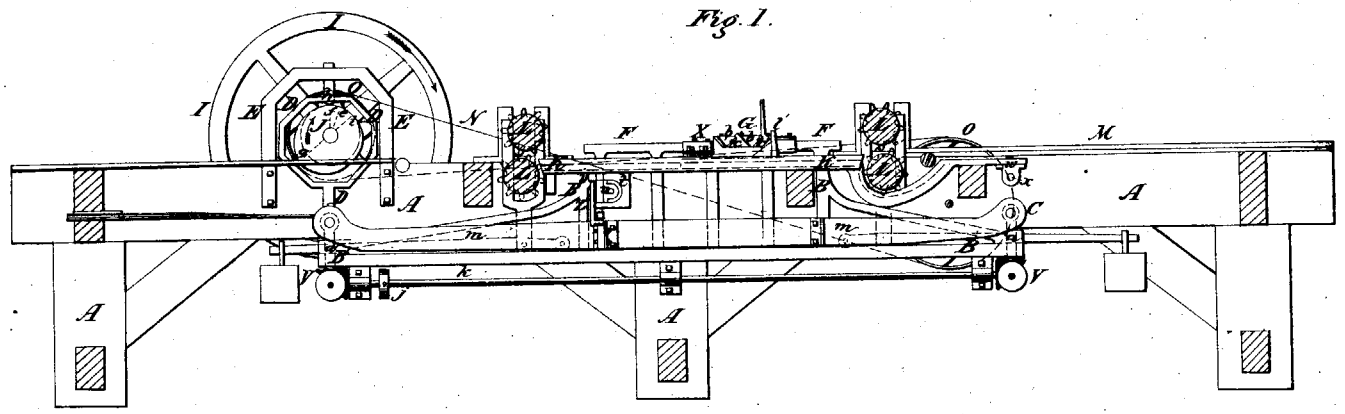

2 Sheets-Sheet 1.

C. Emmons,

Wood Planing Machine.

No. 170. Reissued May 21, 1850.

AM. PHOTO-LITHO. CO. N.Y. (OSBORNE'S PROCESS)

2 Sheets-Sheet 2.

C. Emmons

Wood Planing Machine.

No. 170. Reissued May 21, 1850.

AM. PHOTO-LITHO. CO. N.Y. (OSBORNE'S PROCESS)

UNITED STATES PATENT OFFICE.

WILLIAM EMMONS, OF NEW YORK, N. Y., ADMINISTRATOR OF CALVIN EMMONS.

IMPROVEMENT IN PLANING-MACHINES.

Specification forming part of Letters Patent No. 5,648, dated June 27, 1848; Reissue No. 170, dated May 21, 1850.

*To all whom it may concern:*

Be it known that I, CALVIN EMMONS, of the city, county, and State of New York, have invented a new and useful Improvement in Machinery for Planing, Tonguing, and Grooving Plank or Boards of which the following is a specification.

The nature of my invention consists in the construction and combinations of the several parts, as hereinafter described, and represented in the drawings hereunto annexed, the letters in the respective figures referring to the same parts of the machine.

Figure 3:
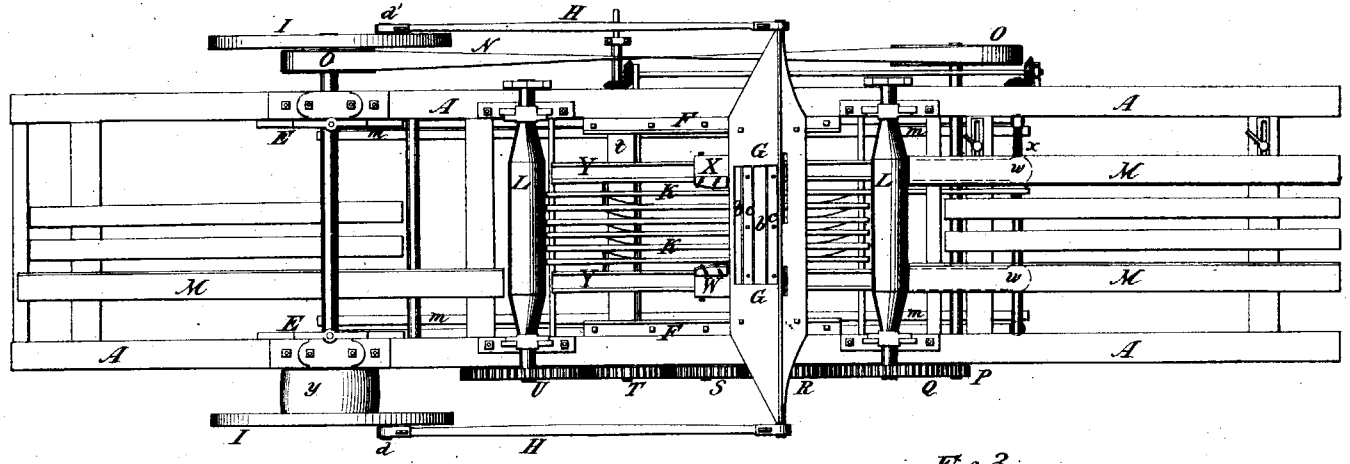
Figure 4:
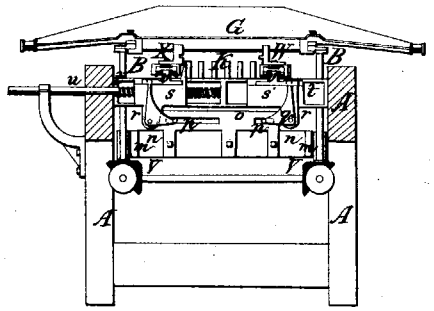

A A A A represent the frame for sustaining the operative parts; B B B B, a lever-frame, the two sides connected by suitable interties and rods and suspended at the four corners by the eyebolts (shown by dotted lines) *a a* and *a′ a′*, a rod passing through the eyes of the bolts *a a*, and permanently secured to the frame by passing through it at C, and serving as a fulcrum of the lever-frame. A rod also passes through the eyes of said suspension-bolts *a′ a′*, as also through an eye of each of the lower shanks of the two suspending-yokes, one of which yokes is shown at D D D, Fig. 1, the top shank of which passes through and is guided by the gallows-frame E E E. F F, slides bolted to the top rail of each of the two sides of the said lever-frame; G G, a plane-stock, with one, two, or more throats, *b b*, Fig. 1, (which is a longitudinal section of the machine,) in form substantially like the throat of a common carpenter's plane, and in which throats is secured, by bolts or otherwise, the planing-knives *c c′*, with regulating-screws at their backs to adjust the same to the face of the plane-stock, which is dressed or cut away in front of each knife a little lower than the face is at the back of each knife; and in order to steady the plane-stock (if found necessary) on the face of the plank or boards, a roller may be attached to the back part of the plane-stock for running on the finished surface of the plank or board. The vertical flange of the plane-stock serves as a stiffening-brace, as also to throw the shavings forward. The plane-stock is secured to the slides F F, on which it works, by suitable jaws and brasses, as shown at Fig. 4. To the arms of said plane-stock (which project each side of the frame of the machine) are attached the connecting-rods H H, as shown in Figs. 2 and 3, the other ends of the connecting-rods taking hold of the crank-pins *d d′* in one of the arms of each of the fly or crank wheels I I. Two eccentric or cam wheels are fastened onto the shaft of the crank-wheels each side of the machine, and a face view of one being shown at I, Fig. 1, and which cam-wheels are constructed as follows, viz: From *e* to *f* is the segment of a true circle, the radii from the axis to *e* and *f* being equal. At *f* commences the eccentricity of the wheel, the periphery of which begins at the point *f* to recede from the true circle, (the true circle being shown by the dotted circle,) and thus gradually increasing the radii of the wheel until the periphery at *g* is at its greatest distance from the axis, and from *g* (passing around in the same direction) the radii is diminished gradually, (but not as rapidly as it was increased,) until at *e* the periphery is again at the true circle, the result of which arrangement in the configuration of the cam-wheel is as follows, viz: The lever-frame B B, &c., being suspended one end from a fixed center or fulcrum, as shown at C, Fig. 1, by the eyebolts *a a*, and other end of the lever-frame by the eyebolts *a′ a′* to the lower shanks of the yokes D D, the bearing-point *h* of the yokes rests upon the periphery of the eccentric or cam wheel, and the whole is so adjusted that when the bearing-points *h* of cam-yokes rest on the true circle of the cam-wheel from *e* to *f* the lever-frame remains in a horizontal position, but as the crank-wheels and cams turn in the direction of the arrows the eccentric or more elevated parts of the periphery of the cam-wheel are successively brought under the bearing or suspending points of the cam-yokes, and thus elevating the yokes, and with them that end of the lever-frame to which they are attached, and the degree of elevation corresponding with the degree of eccentricity of the cam-wheels at the bearing-points of the yokes, and thus cause the lever-frame to vibrate vertically as the crank-wheels revolve, it remaining at rest in a horizontal position during such portion only of each revolution as while the true circles from *e* to *f* of the cam-wheel are passing under the bearing-points of the yokes. In place of the bearing-points of the cam-yokes friction-wheels may be substituted.

K K represent a horizontal grated bed, which supports the plank while being planed, and the upper surface of which is such distance below the face of the plane-stock and the edge of the lowest planing-knife as shall correspond with the thickness to which the board or plank is to be reduced and planed; L L L L, feeding-rollers, with suitable levers and weights attached, for feeding the boards and planks through the machine, the plank being guided in a straight direction as they pass through the machine by suitable straight-edges M M M. The feeding-rollers are driven by the band *n n*, which passes from the pulley O to the pulley-wheel O′. On the opposite end of the shaft on which the pulley O is hung is a pinion, *p*, meshing into the spur-wheel Q on one of the lower feeding-rollers, and from which motion is communicated, through the medium of the intermediate wheels, R, S, and T, to the spur-wheel U (of the same size of the wheel Q) on the lower roller of the other pair of feeding-rollers, the upper and lower rollers of each pair being geared together at their opposite ends, the motion of these feeding-rollers to be adjusted so as to feed the plank forward from one to one and a half inch to each stroke of the plane-stock.

The result of the foregoing arrangement when the machine is put in motion is consequently as follows, viz: The revolving of the crank-wheels communicates, by the connecting-rods H H, a reciprocating motion to the plane-stock, which runs upon and is guided by the straight slides F F. The length of the stroke in an ordinary-sized machine is two feet, and the cam-wheel is set so that its highest point is vertical and under the bearing-point of the cam-yoke on the completion of each forward stroke of the plane-stock. During the next half-revolution of the crank-wheels the lever-frame B B and C, with the slides F F, that guide the plane-stock, gradually approach a horizontal position, and so nearly horizontal on the completion of the back stroke of the plane-stock that the edges of the planing-knives are but slightly elevated above the reduced and finished surface of the plank, the point *i* of the cam-wheels at that time being under the bearing or suspending points of the cam-yokes. As the crank-wheels and cams continue to revolve, and on the completion of the first four inches of the forward stroke of the plane-stock, the peripheries of the cam-wheels from *i* to *e* have moved under the bearing-points of the cam-yokes, and the lever-frame with the slides resumed a horizontal position, and consequently bring the edges of the planing-knives down to a level with the reduced and planed surface of the plank. During the next two and a half inches of the forward stroke of the plane-stock the perfectly circular part of the cam-wheels—viz., from *e* to *f*—passes under the bearing-point of the cam-yoke, and thus allowing during that time the lever-frame and slides to remain in a horizontal position, and consequently that portion of the stroke of the plane-stock and knives is horizontal and parallel with the upper surface of the grated bed, the planing-knives having in the meantime commenced and cut a thin shaving from the plank equal in length to the advance of the feed of the plank during the preceding revolution of the crank-wheels and stroke of the plane-stock, and thus finished that portion of the planed surface of the plank. As the crank-wheels continue to revolve, carrying that part of the periphery of the cam-wheels from *f* to *g* successively under the suspending point of the cam-yoke, that end of the lever-frame is again elevated and attaining its greatest degree of elevation on the completion of the stroke, as before described, the slides F F and plane-stock being in the meantime also elevated correspondingly with their relative position. The eccentricity of the cam-wheel should in an ordinary sized machine for floor plank be sufficient to cause at least about five-eighths of an inch elevation of the plane-stock above the line of the reduced and planed surface of the plank on the completion of each forward stroke, in which the planing-knives will be able to clean themselves from the shavings and to reduce and cut away all the surface of the plank that projects above the gage thickness to which it is required to be reduced, if not exceeding the highest elevation of the knives, on the completion of the stroke, which is five-eighths of an inch above the gaged or finished face of the plank or board, the length of each shaving corresponding with the distance from the point where the planing-knives commence cutting to the point where they leave the unplaned surface of the plank, and which will vary according to the amount of reduction of thickness required.

By the foregoing arrangement in the construction of the cam-wheel the lever-frame and slides, as has been shown, are not permitted during the back stroke of the plane-stock to again approach a horizontal line as rapidly as they were elevated from it, and consequently the planing-knives during their back strokes are kept elevated above and clear from any contact with the plank, and thus avoiding all contact with any grit that might dull the planing-knives, they not being permitted, as hereinbefore shown, to come entirely down to the plank until they have again advanced about four inches of the forward stroke. It will be thus seen that the motion of the plane-stock and knives is analogous to that given to the common jack-plane, when planing gritty lumber, by the hand of the workman.

Figure 2:
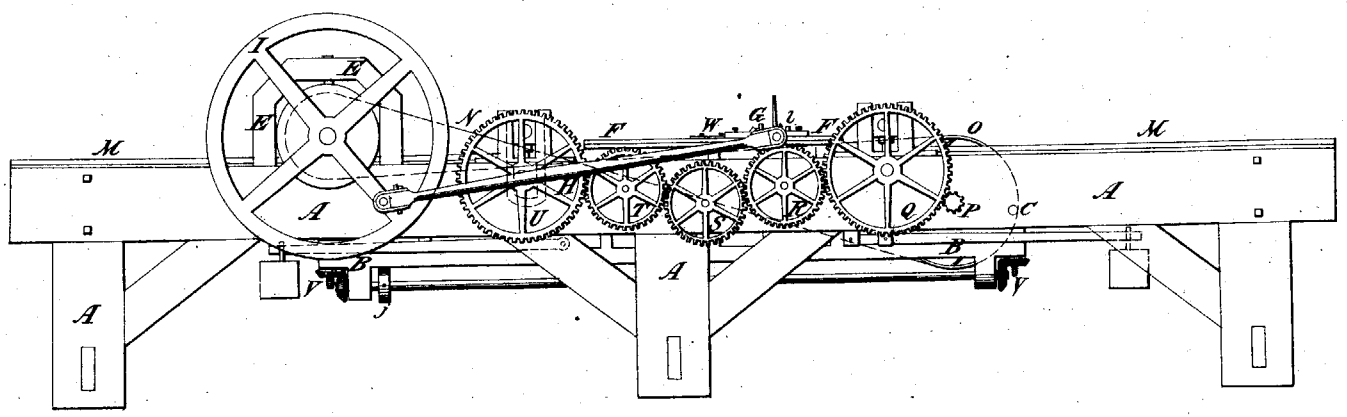

The plane-stock is raised and depressed to accommodate for different thicknesses of boards and planks by means of the small bevel-wheels *b b*, &c., which serve as nuts for the screw ends of each of the four suspension-eye-bolts *a a* and *a′ a′*, and thus sustain the weight of the lever-frame, which rests upon them, and being all connected by gearing, as shown in Figs. 1, 2, and 4, they are all turned simultaneously by the socket-wheel *j* on the horizontal shaft *k* or otherwise, and thus elevating or depressing the lever-frame with the slides and plane-stock without at all changing its horizontal position.

The tonguing and grooving of the plank is done by the tonguing and grooving planes W and X, which are fitted on two or more sets of suitable cutters, which are secured in suitable throats by screws or otherwise, and fitted to stocks with suitable jaws and brasses for running upon the slides Y and Y′. Each side of the plank the face of the tonguing-plane stock is made to correspond with the tongued edge of the plank, and the face of the grooving-plane to correspond with the grooved edge of the plank, and which are driven by means of the arms *l l′*, that project from each of the tonguing and grooving plane-stocks up through suitable openings or slots (in which they traverse) in the back part of the surface-plane stock, as shown in Figs. 1, 2, and 3.

The slides Y and Y′ are made to vibrate horizontally at the same time, in the same manner, and for the same purpose the aforesaid lever-frame does vertically, the motion of the said lever-frame being communicated to them by means and in the manner as follows, viz: *m m m m* are two levers inside the main lever-frame, and suspended by the same rods passing through their ends that pass through the eyebolts *a a* and *a′ a′* for suspending the main lever-frame, and consequently these inside levers vibrate vertically with and in the same manner as the main lever-frame. These inside levers are connected by a cross-tie, *n n*, Fig. 4, and to which is bolted a center plate, *o*, in which are the stops *p p*, into which slots project pins from the ends of each of the horizontal arms of the rock-levers Z′ Z′, and which rock-levers work on fulcrum-pins at *q q* in the arms *r r*, that project down from the face-plates S′ S′, which face-plate S′ is properly secured to the cross-beam *t t*. The other face-plate is fitted so as to slide on the cross-beam and held to its place by a nut secured to the back of the face-plate, and through which nut passes the screw *u*. The ends of the vertical arms of the rock-levers Z Z project into mortises in the foot-pieces *v v*, which foot-pieces are supported by suitable projections from the said face-plates S″ S″, and the said foot-pieces *v v*, being secured to the under side of the slides Y Y′, thus transmit from the vertical vibration of the said levers a horizontal vibration to the slides Y Y′, upon which the tonguing and grooving plane-stocks run, and thus transmitting to the tonguing and grooving planes a horizontal motion analogous to the vertical motion of the surface-plane, the vibratory or traverse motions of the tonguing and grooving planes being about one-third greater than the vertical vibrations of the surface-plane, by reason of the vertical arms of the rock-levers Z Z being about one-third longer than their horizontal arms. The tonguing and grooving plane slides Y Y′ work on the fulcrum *w w*, and are so adjusted that they are parallel with each other and with the length of the plank while they remain stationary during the passage of the true circle *e f* of the cam-wheels under the bearing-points of the cam-yokes, the whole of their vibrations from the parallel being outward from the edge of the plank, and consequently all that portion of each stroke of the tonguing and grooving planes that finishes a portion of the tongue and groove equal in length to the advance of the plank is in a right line with the length of the plank.

To accommodate for tonguing and grooving of different widths of boards and plank, the slide upon which the tonguing-plane runs is adjusted at any required distance from the grooving-plane slide in manner as follows, viz: The face-plate, to which the tonguing-plane slide is connected by the rock-lever Z, is caused to move backward and forward across the machine by turning the screw *u*, and which screw is connected by gearing with the screw *x x* and to a nut, on which screw *x* is secured the fulcrum *w* of the tonguing-plane slide, and consequently as both screws move simultaneously both ends of the slide are simultaneously moved nearer to or farther from the grooving-plane slide without changing the parallelism of the two slides; and for the purpose of providing a support for plank of different widths at a uniform distance from the tonguing and grooving planes, the grated bed is made to contract and expand by means of one end of the outer bar of the bed being connected with the nut of the said screw *u* by a projection from the face-plate S, and the other end being connected with the nut that moves the fulcrum *w* of the tonguing-plane slide, the springs between the respective bars of the bed yielding to the compression as the outer bar is pressed inwardly, and the springs causing the bed to expand as the said outer bar of the bed is carried outwardly. *y* is a driving pulley.

What I claim as my invention, and desire to secure by letters Patent, is—

1. The combination of the lever-frame B B B B, cam-wheel I, and plane-stock G, substantially in the manner described, by means of which combination and the configuration of the cam-wheels, substantially as specified, and the plane-stock which is made to move in a different and lower line during its forward stroke than during its backward stroke, in the manner and for the purposes described.

2. The combination and arrangement of the tonguing and grooving planes W and X, running with the slides $y$ $y'$, and the mode of adjusting the same, in combination with the surface-plane G, the cam-wheels J, and levers B B B B, substantially in the manner specified, for planing, tonguing, and grooving boards and plank at one operation.

3. The mode of contracting and expanding the grated bed, in the manner specified, in combination with the tonguing and grooving planes.

CALVIN EMMONS.

Witnesses:
JAMES BOGARDUS,
JORDAN L. MOTT.